United States Patent [19]

Belart et al.

[11] Patent Number: 4,523,791
[45] Date of Patent: Jun. 18, 1985

[54] METHOD FOR MONITORING AND CONTROLLING HYDRAULIC BRAKE SLIP CONTROL DEVICES SUPPLIED WITH ENERGY FROM AN EXTERNAL SOURCE, AND AN APPARATUS FOR IMPLEMENTING THIS METHOD

[75] Inventors: Juan Belart, Walldorf; Jochen Burgdorf, Offenbach-Rumpenheim; Dieter Kircher, Frankfurt am Main; Hans-Wilhelm Bleckmann, Obermoerlen; Lutz Weise, Mainz, all of Fed. Rep. of Germany

[73] Assignee: ITT Industries, Inc., New York, N.Y.

[21] Appl. No.: 514,062

[22] Filed: Jul. 15, 1983

[30] Foreign Application Priority Data

Aug. 28, 1982 [DE] Fed. Rep. of Germany ....... 3232051

[51] Int. Cl.³ .............................................. B60T 8/04
[52] U.S. Cl. ...................................... 303/92; 303/100; 303/114
[58] Field of Search ................. 303/114, 116, 10, 119, 303/117, 115, 92, 100, 113, 102; 188/181, 151 A

[56] References Cited

U.S. PATENT DOCUMENTS 4,357,054 11/1982 Leiber ............................. 303/114 X
4,362,339 12/1982 Belart ............................. 303/113 X

FOREIGN PATENT DOCUMENTS 3040562 5/1982 Fed. Rep. of Germany .
3040561 5/1982 Fed. Rep. of Germany .

Primary Examiner—Douglas C. Butler
Attorney, Agent, or Firm—James B. Raden; William J. Michals

[57] ABSTRACT

To monitor and control hydraulic brake slip control devices supplied with energy from an external source and intended for use on motor vehicles equipped with several brake circuits, a check is kept on the fluid level in the reservoir holding the hydraulic fluid and on the pressure in the chambers supplied with the external energy. When the fluid level drops, which is detected by a reservoir level warning device, or when the pressure drops causing pressure warning switches to respond, the brake slip control will be only partially deactivated initially by halting the reduction in pressure in the static brake circuits and inhibiting the dynamic fluid flow into the static brake circuits. The dynamic brake circuit will continue to allow a controlled deceleration of the connected wheels. The partial deactivation will be initiated immediately or with a time delay or only if the error signals continue to be present beyond a predetermined period of time. Depending on the duration of the error signals or following the lapse of a predetermined period of time, the brake slip control will be deactivated fully or, if the error signals cease, the partial deactivation will be cancelled.

28 Claims, 3 Drawing Figures

METHOD FOR MONITORING AND CONTROLLING HYDRAULIC BRAKE SLIP CONTROL DEVICES SUPPLIED WITH ENERGY FROM AN EXTERNAL SOURCE, AND AN APPARATUS FOR IMPLEMENTING THIS METHOD

BACKGROUND OF THE INVENTION

The present invention relates to a method for monitoring and controlling vehicular hydraulic brake slip control devices supplied with energy from an external source on the occurrence of failures in the hydraulic system, in particular on the loss of hydraulic fluid or on a pressure drop resulting from defects. The devices concerned are of the type in which the pressure is transmitted to the brake wheel cylinders via one or several static brake circuits and/or via one or several dynamic circuits, preferably brake circuits, wherein in the event of a control action taking place, i.e., when the brake slip control responds, fluid flow is admitted from the dynamic circuit into the static brake circuits, with reservoirs supplying the hydraulic system with the hydraulic fluid. Apparatus to implement this method are also part of this invention.

In brake slip control devices of the prior art (German Pat. DE-OS Nos. 3,040,561 and 3,040,562), valves are provided which, in the event of a pressure loss in the external energy system, will be hydraulically switched to a closed position, thereby inhibiting the dynamic fluid flow into the static brake circuits. Further, as a result of the pressure failure, a valve in the common pressure fluid return line from the pressure-reducing valves associated with the control units will also be closed by hydraulic means. This prevents the static circuits from being controlled to an empty condition on the failure of external energy. As a result controlling the brake slip is no longer possible in the event of a disturbance. In this known device, a drop in the reservoir fluid level resulting from a leak will invariably not activate the measures described until, as a result of this loss of fluid, the pressure in the system drops below the switch-over value of the hydraulically activated valves. Further, it is known to provide for deactivation of the entire brake slip control on the occurrence of any disturbance for safety reasons to avoid any deterioration, at least when compared to devices having no brake slip control system. This has, however, the disadvantage that wheel lock with all the known adverse effects may occur as early as on a failure of one brake circuit or even as a result of a relatively insignificant fault.

SUMMARY OF THE INVENTION

It is, therefore, an object of this invention to maintain the brake slip control operative as long as possible on the occurrence of a failure in the hydraulic system without impairing the safety, although with the necessary restrictions depending on the type of defect.

A feature of the present invention is the provison of a method for monitoring and controlling vehicular hydraulic brake slip control devices disposed in a hydraulic brake system having at least one static brake circuit, at least one dynamic brake circuit and a hydraulic fluid reservoir, fluid being admitted into the static brake circuit from the dynamic brake circuit during a control cycle of the control devices, comprising the steps of detecting at least one of an insufficent amount of fluid in the reservoir and an inadequate pressure in one of an external energy supply for chambers of the brake system and the chambers of the brake system; and partially deactivating the brake slip control devices by halting pressure reduction in the static brake circuit and inhibiting dynamic fluid flow into the static brake circuit from the dynamic brake circuit when at least one of the insufficient amount of fluid and the inadequate pressure is detected.

It has been shown that the above object can be achieved in a surprisingly simple and technologically very advanced manner by providing initially only partial deactivation of the brake slip control when the quantity of fluid in the hydraulic system and/or the pressure in the chambers supplied with external energy, i.e., in the pressure accumulator or in the chambers connected therewith, is inadequate. The present invention permits a controlled braking action with an optimum stopping distance and without the danger of skidding to be achieved even if a leak occurs in one of the static circuits. In this event, the dynamic brake circuit will remain fully operative, thus maintaining directional stability when it acts on the rear axle. In this case, the intact static brake circuit will continue to contribute to the braking action, even though a wheel may possibly lock.

In an advantageous embodiment of this invention, the brake slip control is partially deactivated on a pressure drop in the pressure accumulator or in the chambers connected therewith—depending on where the pressure reading is taken—initially for a predetermined period of one second, for instance, and is deactivated to its full extent only after the predetermined period has elapsed. On the other hand, after lapse of the predetermined period of time during which, as a first reaction to the fluid level drop or to the pressure reduction, the pressure decrease in the static brake circuits is halted and the dynamic fluid flow is inhibited, it is also possible to cancel the partial deactivation if, after this period of time, the pressure has exceeded a predetermined threshold value. If the pressure continues to be inadequate after this period, the brake slip control will be deactivated for all brake circuits.

In another embodiment of this invention, partial deactivation of the brake slip control will occur if the pressure in the pressure accumulator or in the chambers connected therewith drops below a first or top threshold value, while it will be fully deactivated if the pressure drops below a second or bottom threshold value. It is also possible to allow a predetermined time delay before tha partial or full deactivation is initiated on a drop in the fluid level or pressure and, if the case arises, only if after a specific period of time the signals indicative of the fault (pressure drop and/or insufficient amount of fluid) still persist.

Another feature of the present invention is the provision of apparatus for monitoring and controlling a vehicular hydraulic brake slip control device comprising a master brake cylinder controlled by a pedal-operated brake valve arrangement coupled thereof; an external energy supply system including a hydraulic pressure accumulator coupled to the valve arrangement to provide pressurized brake fluid for the valve arrangement; a fluid reservoir coupled to the accumulator, the master cylinder of the valve arrangement for storing unpressurized brake fluid; at least one static brake circuit coupled between the master cylinder and at least one wheel brake cylinder; at least one dynamic brake circuit coupled between the valve arrangement and at least one other wheel brake cylinder; a pair of valves coupled to the reservoir, the master cylinder and the valve arrangement to control flow of the pressurized brake fluid from the dynamic brake circuit to the static brake circuit during a control cycle of the slip control device; slip control valves coupled in the static and dynamic brake circuits to control brake pressure at the one and the one other wheel brake cylinders; an electronic control unit coupled to the first pair of valves and the slip control valves for control thereof; switching means coupled to the control unit and at least one of the reservoir and the energy supply system responsive to at least one of an inadequate amount of the unpressurized brake fluid in the reservoir and an inadequate pressure in one of the energy supply system and chambers of the valve arrangement, the switching means activating the control unit to halt pressure decrease in the static brake circuit and to halt the flow of the pressurized brake fluid into the static brake circuit.

In a further embodiment of the apparatus of this invention, electromagnetically operated valves are provided to control the brake pressure on the wheels and the dynamic fluid flow into the static brake circuits, with the switching means acting directly upon the electromagnetic pressure reducing valves in the pressure fluid return line and upon the electromagnetic valves controlling the dynamic fluid flow.

Advantageously, the electromagnetic valves are operated such that to accomplish a partial deactivation of the system it suffices to prevent these valves from responding.

In another embodiment of this invention, additional electromagnetically actuatable non-return valves are provided in the return line of the static circuits and/or in the line supplying the fluid from the dynamic circuit into the static circuits, the valves being actuated by the switching means.

Further, it is an advantage in some cases to provide switching means which are set at two predetermined threshold values of different pressure magnitudes and which cause the partial deactivation when the pressure in the system supplied with external energy is between the top and the bottom threshold value.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
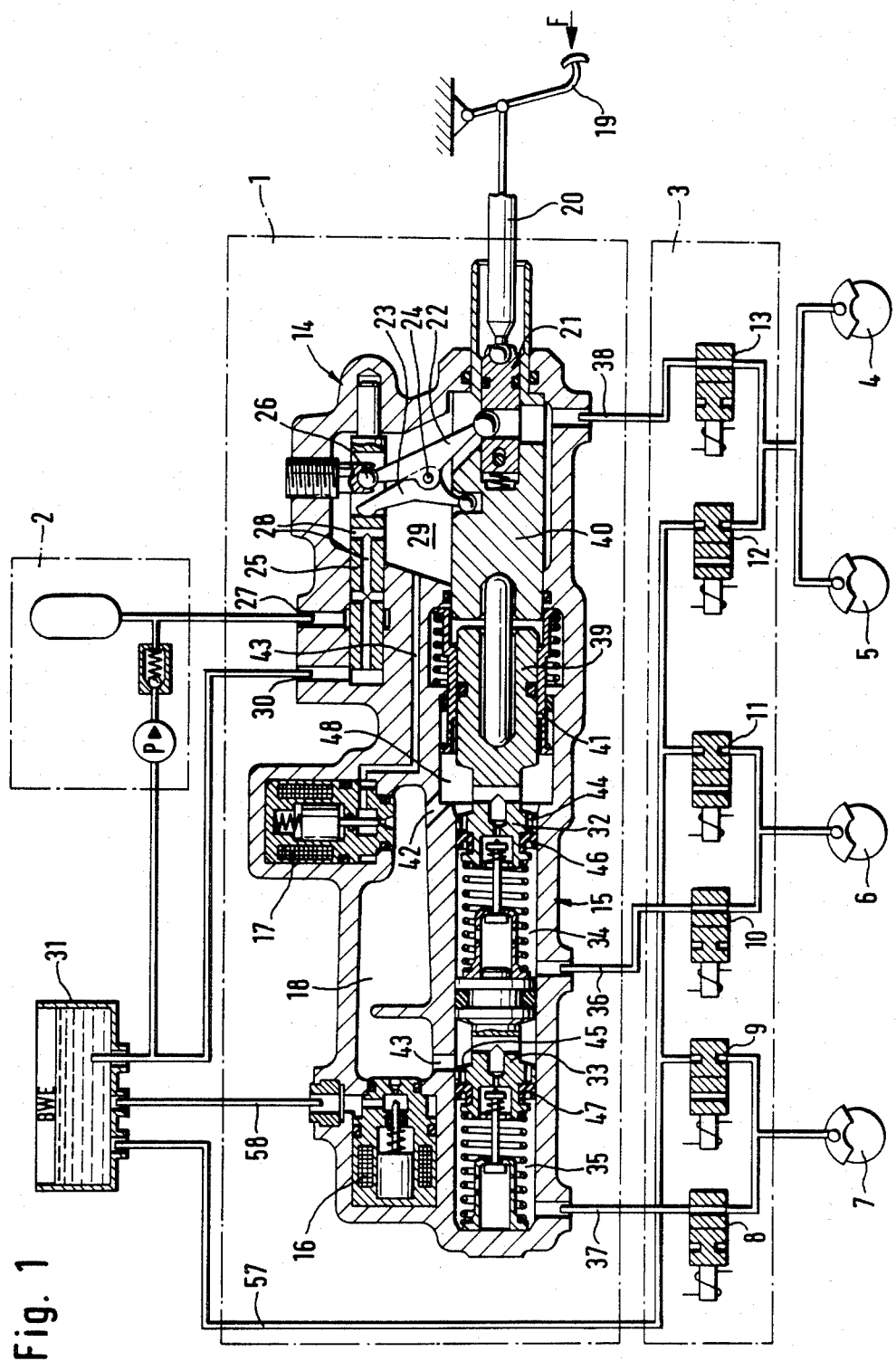
FIG. 1 is a longitudinal cross sectional view of a brake slip control device in accordance with the principles of the present invention.

The brake slip control device illustrated in FIG. 1 and intended for use in a motor vehicle comprises a hydraulic unit 1, an external energy supply system 2 and a valve cluster 3 for slip control comprising the electromagnetic pressure-increasing and pressure-decreasing valves, each being associated with its respective wheel or axle. In the embodiment of the invention shown, the two front wheels or wheel brake cylinders 6 and 7 are energized separately, while the two wheels or wheel brake cylinders 4 and 5 of the rear axle are energized jointly. Valves 8 to 13 are only shown by their graphical symbols.

The sensors required for such devices to sense the wheel speeds and the electronics for generation of the control signals for valves 8 to 13 are not shown.

The hydraulic unit 1 is essentially subdivided into a brake valve 14, a tendem master cylinder 15 and two master valves 16 and 17 with their associated pre-chamber 18.

In the embodiment of the invention herein described, the brake valve 14 is constructed as a compact hydraulic brake booster. When the brake pedal 19 is depressed, the pedal force F will be transmitted, through an operating rod 20 and an operating rod piston 21, to an arrangement including two levers 22 and 23 pivotally connected by means of a pin 24, and thence to the control piston 25 of the brake valve. Since the force required to displace the booster piston 40 of brake valve 14 is substantially higher than the force necessary for displacement of control piston 25, turning of the lever 22 on its pivot 24 by the application of the force F will initally cause a displacement of control piston 25 to the left when viewing FIG. 1, so that the external energy source 2 will become connected with the booster chamber 29 through the inlet 27 and the inner bores 28 in control piston 25. Before chamber 29 is connected to inlet 27, the orifice 30, which connects the booster chamber 29 with a pressure compensating and storage reservoir 31 when the brake is not applied, will be closed. The pressure developing in pressure chamber 29 will also act upon booster piston 40, displacing it to the left. The cylinder pistons 32 and 33 of tandem master cylinder 15 will be likewise displaced, resulting in the buildup of brake pressure in the associated pressure chambers 34 and 35 as well as in the connected static brake circuits 36 and 37 which are associated with the two front wheels 6 and 7. The dynamic circuit 38 to which the rear wheels 4 and 5 are connected was pressurized at the time of pressure buildup in booster chamber 29.

The intermediate member 39 connecting the booster piston 40 with the tandem master cylinder pistons 32, 33 and being integrally formed with master cylinder piston 32, carries a positioning piston or positioning sleeve 41 which, when the control action starts, prevents in a known manner the tandem master cylinder pistons from being displaced too far to the left and, thus, the working chambers 34 and 35 from being controlled to an empty condition.

When the brake slip control responds as a result of an impending locked condition of one or several wheels, the two solenoid valves 16 and 17, which are referred to as the master valves, will be energized, causing at the same time closing of the line 58 connected with the reservoir 31 which is under atmospheric pressure, and opening of the line 43 carrying fluid from the booster chamber 29 to the pre-chamber 18. This is the commencement of dynamic flow into the static brake circuits. The hydraulic fluid which is under increased pressure because of external energy source 2 will flow from the pre-chamber 18 through the connecting channels 42 and 43 to the secondary ends of the two master cylinder pistons 32 and 33 and, thence, via pistons 32 and 33 through compensating bores 44 and 45 having the adjacent sealing lips 46 and 47 which serve as check valves, into the associated working chambers 34 and 35.

As a result of the increased pressure prevailing in the chamber 48 on the secondary end of piston 32, the positioning piston 41 which was in a floating or middle position prior to the commencement of the control action, will be shifted to the right up to its stop, in opposition to the direction of the pedal force F.

Figure 2:
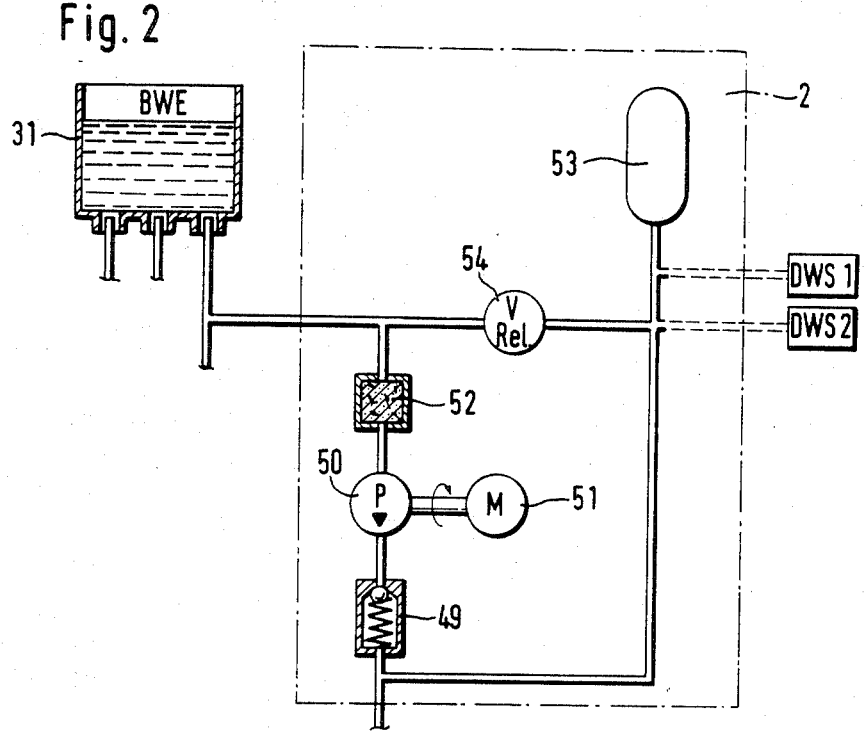
FIG. 2 is a detail view of the external energy supply system.

As shown in FIG. 2, the external energy supply system 2 comprises a pump 50 with an associated check valve 49, a driving motor 51, a dirt trap or filter 52 and a pressure accumulator 53 which is connected to the reservoir 31 via a pressure relief valve 54. The pressure in the pressure accumulator 53 or in the external energy supply system is monitored by means of the two pressure warning switches DWS 1 and DWS 2. Pressure warning switch DWS 1 is set at a top or first pressure threshold value. While pressure below this top threshold is indicative of a fault in the external energy supply system, in the chambers connected therewith or in the static circuits, a braking action with controlled slip is still possible, at least in the dynamic circuit, as long as the warning switch DWS 2, which is set at a bottom or second pressure threshold value, has not responded as yet. In contrast, if the pressure falls below the value at which switch DWS 2 is set, the brake slip control action will be deactivated for safety reasons to permit an emergency braking, i.e., a braking without brake slip control using the intact brake circuits.

Figure 3:
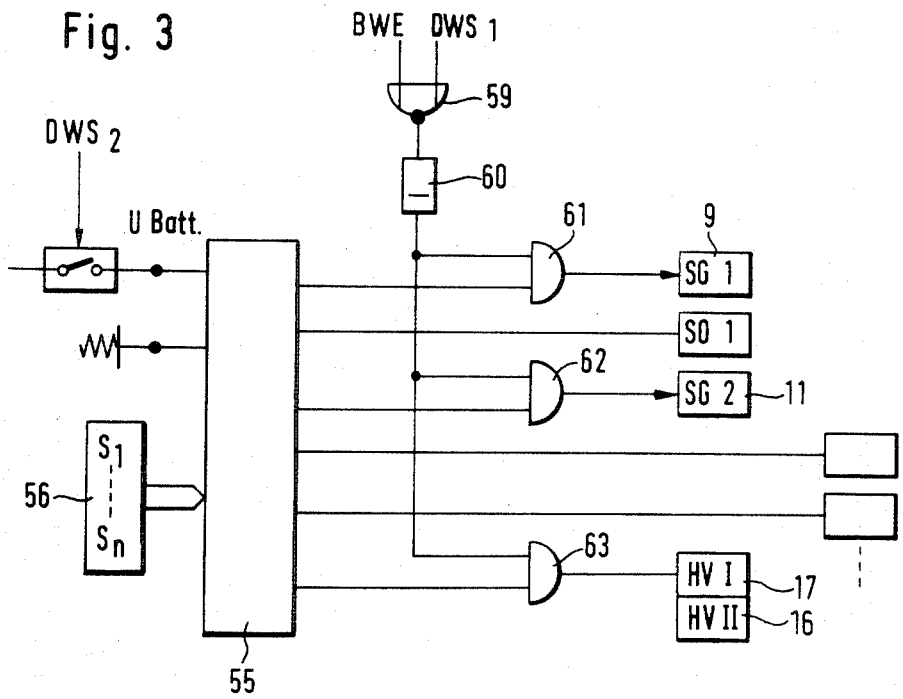
FIG. 3 is a block diagram of a circuit for controlling the device of FIG. 1.

FIG. 3 shows, by way of example and in a very simplified block diagram form, a circuit configuration for activating the partial or total deactivation of the brake slip control on response of the reservoir or pressure warning devices BWE or DWS, respectively.

When the fluid level in the reservoir 31 of FIG. 1 is insufficient, the reservoir warning device BWE will produce an electric signal which is indicated by optical means and at the same time acts on the control circuitry electrically. Such a signal may be obtained, for example, by means of a float changing a switch position when the fluid level in the reservoir 31 drops. In order to be able to check the switches for operational reliability at all times, contacts are provided which "open" when the signal is activated. The pressure warning switches DWS 1 and DWS 2 are actuated by means of pressure sensors arranged in or close to the chamber to be monitored.

By means of the control unit 55 indicated in FIG. 3, signals will be generated in response to the rotational behavior of the individual wheels as determined by the symbolically indicated sensors 56, with the signals switching the electromagnetic pressure-increasing and pressure-reducing valves 8–13. The master valves 16 and 17 which control the dynamic fluid flow into the static brake circuits as well as the pressure in the pre-chamber 18 are likewise energized and switched over when the brake slip control action commences.

Serving to reduce the brake pressure in the static brake circuits that is in the front-axle brake circuits in the embodiment herein described in the presence of an imminent locked condition of a wheel, are the valves 9 and 11 of FIGS. 1 and 3, referred to as SG valves in the drawing (valves closed in the de-energized state), which, following their energization, establish through the hydraulic line 57 a connection between brake wheel cylinders 6 and 7 and reservoir 31 which is exposed to atmospheric pressure, thereby decreasing brake pressure. In a similar manner, the pressure in the pre-chamber 18 will be reduced via master valve 16 and line 58, as soon as this valve becomes de-energized. With master valve 17 in the de-energized state, the dynamic fluid flow into the pre-chamber 18 is halted.

The master valves 16 and 17 are suitably connected in parallel or in series so that both valves are invariably switched over at the same time, the switch condition "open/close" of the two master valves being, however, always opposed.

If the reservoir warning device BWE or the pressure warning switch DWS 1 signals an insufficient fluid level or pressure, a logic zero will appear at the output of the NOR gate 59 of FIG. 3 so that, following lapse of the time period predetermined by the delay element 60, the solenoid valves 9, 11, 16 and 17 are prevented from responding as a result of the interconnected AND gates 61 to 63. This prevents a pressure decrease on the vehicle's front axle wheels 6 and 7 linked to the static brake circuits, in addition to preventing a further dynamic flow into the pre-chamber 18. In contrast, the dynamic brake circuit 38 which is linked to the brake wheel cylinders on the rear axle via solenoid valves 12 and 13 will remain unaffected, permitting a controlled deceleration of the rear wheels of the dynamic brake circuit as long as sufficient pressure is available.

Should, however, the pressure fall below the set value of switch DWS 2 which, for instance, may be due to a failure of the external energy supply or a leak in the dynamic circuit, the embodiment of the invention herein described will provide for cutoff of the power supply to the electronic control unit 55, causing all solenoid valves to assume their switching positions symbolically illustrated in FIG. 1, in which position all pressure-reducing valves 9, 11 and 13, that means on both the front axle and the rear axle, and master valve 17 which controls the dynamic fluid flow will close or remain closed. All other solenoid valves will be permanently open in the de-energized state. Temporary coupling of the brake circuits via the pressure-reducing valves 9, 11 and 13 and via master valve 17 is thereby prevented, so that a broken line or a leak can only result in the excape of pressure fluid from the brake circuit affected.

Instead of the circuit configuration illustrated in FIG. 3, an embodiment of the invention not shown herein provides for use of the reservoir warning device (BWE) and/or pressure warning switch (DWS) signals to directly intervene in the electronic control unit or the control program and to actuate the partial or full deactivation when necessary. Dependent on the logic used in the individual cases to control the solenoid valves, a plurality of variants with different time delay devices is possible.

Depending on the expected sources of error and safety regulations, it may prove useful, following response of the switches BWE or DWS 1, to arrange for immediate or, by means of the time function element 60, time-delayed release of the described partial deactivation, i.e., the de-energization of pressure-reducing valves 9 and 11 on the front axle and of master valve 17. It will be suitable to have the partial deactivation not start until after a minimum duration of the BWE or DWS 1 signals. Also, it may be suitable, after a predetermined time of, say, a few seconds, to cancel the partial deactivation if the BWE or DWS 1 signals cease to be present beyond the predetermined period of time. The partial deactivation suitably is not cancelled if the pressure falls below the top threshold value (DWS 1) successively at short intervals after it has recovered from the partial deactivation, because this is an indication of a defect in the static brake circuits.

In other cases, it should, however, be necessary for safety reasons to have the partial deactivation followed by a full deactivation of the brake slip control after a short delay, which cannot be cancelled until after inspection and repair of the device.

In the event of a leak in any one of the two static circuits 36 and 37 which in the embodiment herein described are each linked to a front wheel, the falling fluid level will cause a BWE signal and thereby an immediate or time-delayed partial deactivation of the brake slip control. The intact static brake circuit, which is not controlled, will contribute to the further braking action. The dynamic brake circuit on the rear axle will remain fully operative. A tendency to lock will cause the device to react by a pressure decrease on the rear axle, thus maintaining the vehicle's directional stability. Thus, the failure of one static brake circuit and the locking second front wheel will merely result in only a minor lengthening of the stopping distance. Consequently, the advantage over an immediate deactivation of the entire slip control is substantial.

In another embodiment of this invention, the pressure-responsive sensors for actuating the switches DWS 1 and DWS 2 may be connected to booster chamber 29 or to the channel 43 of FIG. 1 which leads to master valve 17. In this case, signalling and partial deactivation will be accomplished also if the fault does not lie in the external energy supply system but in the booster chamber. A breakage of levers 22 and 23 may be involved, for instance. In this circuit construction, however, the logic has to be suitably modified to make allowance for the fact that the pressure in chamber 29 and channel 43 is not built up until the brake is applied.

The monitoring function on the pressure in booster chamber 29 could also be extended to cover the pressure in the external energy supply system.

Finally, when an error condition is signalled, the possibility also exists to include additional valves in the pressure fluid return line to prevent the pressure decrease and to isolate the brake circuits from one another. This involves, however, added expenditure which can be justified only in special cases.

While we have described above the principles of our invention in connection with specific apparatus, it is to be clearly understood that this description is made only by way of example and not as a limitation to the scope of our invention as set forth in the objects thereof and in the accompanying claims.

We claim:

1. A method for monitoring and controlling vehicular hydraulic brake slip control devices disposed in a hydraulic brake system having a plurality of brake circuits interconnected with the vehicle wheels and having at least one static brake circuit, at least one dynamic brake circuit and a hydraulic fluid reservoir, fluid being admitted into said static brake circuit from said dynamic brake circuit during a control cycle of said control devices, comprising the steps of:
   detecting at least one of an insufficient amount of fluid in said reservoir and an inadequate pressure in one of an external energy supply for chambers of said brake system and said chamber of said brake system;
   providing a signal indicative of the insufficient fluid and inadequate pressure;
   partially deactivating said brake slip control devices in response to said signal by halting pressure reduction in said static brake circuit and inhibiting dynamic fluid flow into said static brake circuit from said dynamic brake circuit when at least one of said insufficient amount of fluid and said inadequate pressure is detected; and,
   controlling deceleration of the connected wheels with said dynamic brake circuit during said deactivating step.

2. A method according to claim 1, wherein
said step of partially deactivating includes partially deactivating said brake slip control devices for a predetermined period of time, and further including the step of
fully deactivating said brake slip control devices after said predetermined period of time has elapsed.

3. A method according to claim 2, wherein
said step of partially deactivating responds to said inadequate pressure being below a top threshold value, and
said step of fully deactivating responds to said inadequate pressure being below a bottom threshold value.

4. A method according to claim 3, wherein
said step of partially deactivating is initiated only after a predetermined time delay.

5. A method according to claim 3, wherein
both of said steps of partial and fully deactivating are initiated only if fault signals produced by said step of detecting still persist after a given period of time.

6. A method according to claim 2, wherein
said step of partially deactivating is initiated only after a predetermined time delay.

7. A method according to claim 2, wherein
both of said steps of partial and fully deactivating are initiated only if fault signals produced by said step of detecting still persist after a given period of time.

8. A method according to claim 1, wherein
said step of partially deactivating includes partially deactivating said brake slip control devices for a predetermined period of time, and further including the steps of
cancelling said steps of partially deactivating if said inadequate pressure has exceeded a predetermined threshold value, and
fully deactivating said brake slip control devices if said predetermined threshold value is not exceeded.

9. A method according to claim 8, wherein
said step of cancelling said step of partially deactivating is initiated only after lapse of a given period of time after exceeding said predetermined threshold value.

10. A method according to claim 9, wherein
said step of partially deactivating is initiated only after a predetermined time delay.

11. A method according to claim 9, wherein
both of said steps of partial and fully deactivating are initiated only if fault signals produced by said step of detecting still persist after a given period of time.

12. A method according to claim 8, wherein
said step of partially deactivating is initiated only after a predetermined time delay.

13. A method according to claim 8, wherein
both of said steps of partial and fully deactivating are initiated only if fault signals produced by said step of detecting still persist after a given period of time.

14. A method according to claim 1, wherein
said step of partially deactivating is initiated only after a predetermined time delay.

15. Apparatus for monitoring and controlling a vehicular hydraulic brake slip control device comprising:
   a master brake cylinder controlled by a pedal-operated brake valve arrangement coupled thereto;
   an external energy supply system including a hydraulic pressure accumulator coupled to said valve arrangement to provide pressurized brake fluid for said valve arrangement;
   a fluid reservoir coupled to said accumulator, said master cylinder and said valve arrangement for storing unpressurized brake fluid;
   at least one static brake circuit coupled between said master cylinder and at least one wheel brake cylinder;
   at least one dynamic brake circuit coupled between said valve arrangement and at least one other wheel brake cylinder;
   a pair of valves coupled to said reservoir, said master cylinder and said valve arrangement to control flow of said pressurized brake fluid from said dynamic brake circuit to said static brake circuit during a control cycle of said slip control device;
   slip control valves coupled in said static and dynamic brake circuits to control brake pressure at said one and said one other wheel brake cylinders;
   an electronic control unit coupled to said first pair of valves and said slip control valves for control thereof;
   switching means coupled to said control unit and at least one of said reservoir and said energy supply system responsive to at least one of an inadequate amount of said unpressurized brake fluid in said reservoir and an inadequate pressure in one of said energy supply system and chambers of said valve arrangement, said switching means activating said control unit to halt pressure decrease in said static brake circuit and to halt said flow of said pressurized brake fluid into said static brake circuit.

16. Apparatus according to claim 15, wherein
said pair of valves and said slip control valves are electromagnetic valves, and
said control unit acts on at least pressure-reducing valves of said slip control valves in a return line between said static brake circuit and said reservoir and on at least one of said pair of valves.

17. Apparatus according to claim 16, wherein
said switching means includes
   two pressure warning switches each set at two different pressure threshold values coupled to said energy supply system, and
said control unit responds to pressure between said two threshold values to halt pressure decrease in said static brake circuit and to halt said flow of said pressurized brake fluid into said static brake circuit.

18. Apparatus according to claim 17, wherein
said control unit responds to said pressure between said two threshold values after a predetermined time period to fully deactivate said slip control device.

19. Apparatus according to claim 17, wherein
said control unit responds to pressure below the lower one of said two threshold values to fully deactivate said slip control device.

20. Apparatus according to claim 19, wherein
said control unit responds to said pressure below the lower one of said two threshold values after a given time delay to fully deactivate said slip control device.

21. Apparatus according to claim 20, wherein
said control unit cuts off power to said slip control device to fully deactivate said slip control device.

22. Apparatus according to claim 19, wherein
said control unit cuts off power to said slip control device to fully deactivate said slip control device.

23. Apparatus according to claim 15, wherein
said switching means includes
   two pressure warning switches each set at two different pressure threshold values coupled to said energy supply system, and
said control unit responds to pressure between said two threshold values to halt pressure decrease in said static brake circuit and to halt said flow of said pressurized brake fluid into said static brake circuit.

24. Apparatus according to claim 23, wherein
said control unit responds to said pressure between said two threshold values after a predetermined time period to fully deactivate said slip control device.

25. Apparatus according to claim 24, wherein
said control unit responds to pressure below the lower one of said two threshold values to fully deactivate said slip control device.

26. Apparatus according to claim 25, wherein
said control unit responds to said pressure below the lower one of said two threshold values after a given time delay to fully deactivate said slip control device.

27. Apparatus according to claim 26, wherein
said control unit cuts off power to said slip control device to fully deactivate said slip control device.

28. Apparatus according to claim 25, wherein
said control unit cuts off power to said slip control device to fully deactivate said slip control device.

* * * * *